No. 759,670.                                                                                              Patented May 10, 1904.

UNITED STATES PATENT OFFICE.

ERNEST P. CLARK, OF NEW YORK, N. Y., ASSIGNOR OF ONE-HALF TO
EDWARD BALTZLEY, OF GLEN ECHO, MARYLAND.

REDUCTION OF COPPER ORES.

SPECIFICATION forming part of Letters Patent No. 759,670, dated May 10, 1904.

Application filed September 10, 1902. Serial No. 122,785. (No specimens.)

*To all whom it may concern:*

Be it known that I, ERNEST P. CLARK, a citizen of the United States, residing at the city of New York, in the borough of Manhattan and State of New York, have invented certain new and useful Improvements in the Reduction of Copper Ores, of which the following is a full, clear, and exact description.

This invention relates to a method of and means for extracting copper from low-grade ores of the varieties carrying copper in the form of carbonates, oxids, sulfids, and finely-divided metallic copper, and especially to certain methods and means for securing the copper contents at the lowest possible cost. In working with ores of this class it is found that the carbonates, oxids, and metallic copper are readily soluble in the solution generally employed, but that the sulfids are not soluble without previously oxidizing, which is generally accomplished by roasting the ores, and in all mixed ores of this character whenever it has been attempted to obtain their values by such processes as herein contemplated the first proceeding has almost invariably been to roast the entire body of ore for the purpose of oxidizing that portion of the copper existing as sulfids. This entails a large and unnecessary expense for roasting, which I eliminate, as hereinafter described. Ores of this character also usually carry iron, and this has proved an obstacle to nearly all processes used for extracting the copper from low-grade ores. I have found, however, that a certain proportion of sulfate of iron added to the solution used for leaching prevents to a large extent the solution from attacking the iron contained in the ore and at the same time adds greatly to the solvent power of the solution on the copper.

My process is in outline as follows: The ore is first pulverized to a proper degree of fineness, then transferred to leaching-tanks of the usual description, and is leached with a solution composed of water, sulfuric acid, and sulfate of iron, prepared as follows: In the stock-tank used for making up solution the proper amount of water is first placed, then sulfuric acid is added to the water until the gravity reaches $7\frac{1}{2}°$ to $8°$ Baumé, which requires about six per cent. of ordinary commercial sulfuric acid. Then sulfate of iron is added in the proportion of about one to one and one-fourth per cent. of the total weight of water and acid combined. As soon as the sulfate of iron is dissolved the solution is ready for immediate use. It is passed into the leaching-tank on top of the ore and filters through it slowly, coming away from the filter-bottom as a blue solution, carrying the copper contents of the ore in the form of sulfate of copper. This solution passes at once to the deposition-tanks, where the copper is deposited either electrolytically or by any other suitable means. The solution being deprived of its copper, or the greater portion thereof, is returned to the stock-tank and is ready to pass through a second mass of pulverized ore. The solution in its passage through the ore extracts, as before stated, all of the copper present as carbonates, oxids, or metallic copper. The portion of copper present as sulfids still remains in the ore and is insoluble in this solution. The ore is now washed from the leaching-tank and passed over concentrators. The sulfids being the heavier part of the ore are readily separated by the concentrators and are then oxidized by roasting or any other suitable means and are then ready to be added to the next charge of ore in one of the leaching-tanks. By this means it is only necessary to roast or otherwise oxidize the actual sulfids contained in the ore as distinguished from the usual proceeding of roasting the entire body of ore, and as in such ores the sulfids frequently constitute as little as ten per cent. of the values in the ores the saving is very large.

The solution mentioned above of sulfuric acid and water—$7\frac{1}{2}°$ to $8°$ Baumé and one to one and one-fourth per cent. sulfate of iron added—has been found in practice to have the greatest possible solvent power on the copper contents of the ore when present in the forms mentioned above, also to have very little solvent action on the iron contained in the ore. The result in practice is that ore can be thoroughly leached by this solution in four hours, which would require ten or twelve hours if simply sulfuric acid and water were used as a solvent. This solution is very valuable as facilitating the work and saving time, causing a greater amount of copper to be extracted with the same size of apparatus in a given time than by the use of other solutions.

Having described my invention, I claim—

1. A process for working the mixed ores of copper, consisting in first leaching the ore raw to extract the soluble contents, then concentrating the insoluble portion of the copper contents, and rendering this portion soluble by oxidizing it and then leaching the same, substantially as described.

2. The process of obtaining copper from its mixed ores, which consists in first leaching the pulverized ore with a solution of water, sulfuric acid and sulfate of iron to obtain the soluble contents, then separating the insoluble contents from the remaining mass, then oxidizing the said insoluble contents and finally leaching the same to obtain the values therein.

In witness whereof I subscribe my signature in presence of two witnesses.

ERNEST P. CLARK.

Witnesses:
WALDO M. CHAPIN,
WM. A. ROSENBAUM.